Sept. 29, 1931.  F. JUNGBLUT  1,825,403
MACHINE DRIVE CONTROL
Filed May 17, 1926
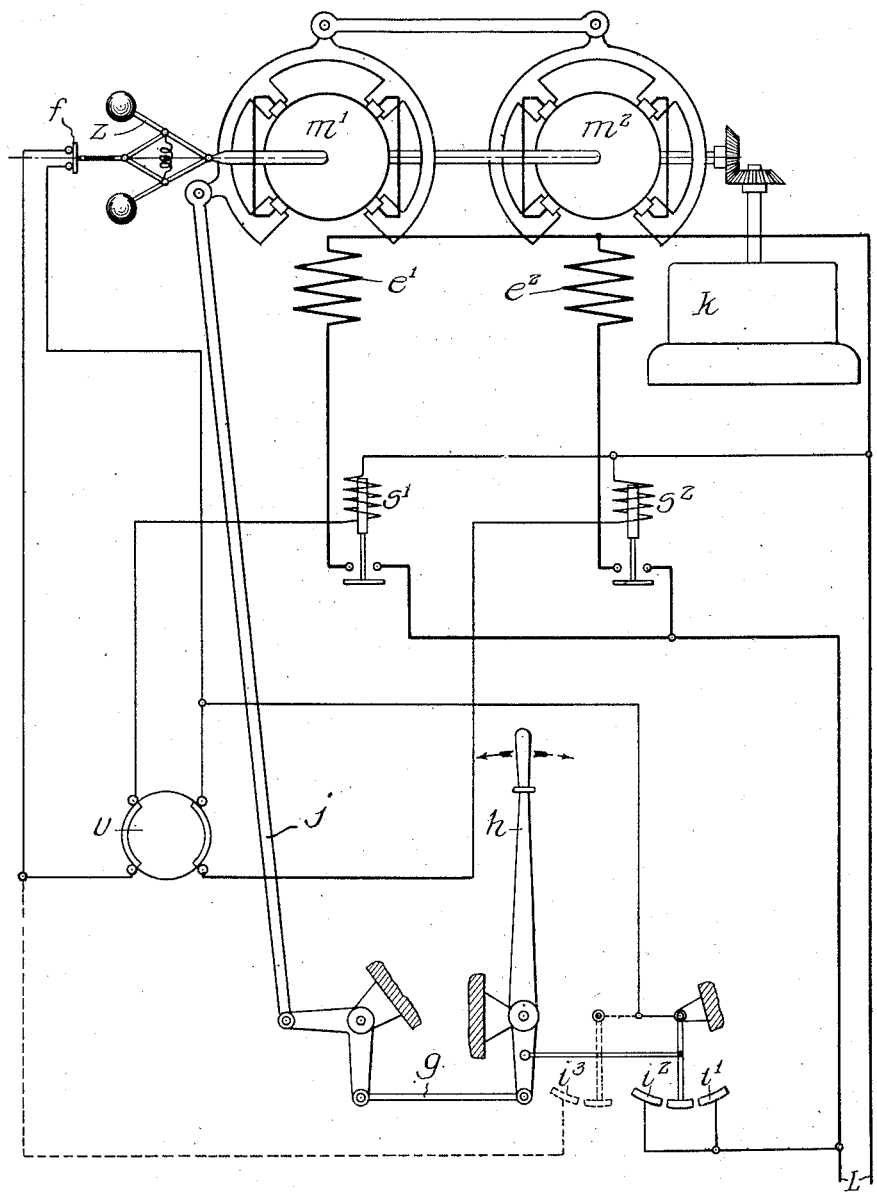
Inventor:
Ferdinand Jungblut,
By Cromwell, Greist & Warden
Attys.

Patented Sept. 29, 1931

1,825,403

UNITED STATES PATENT OFFICE

FERDINAND JUNGBLUT, OF MANNHEIM, GERMANY, ASSIGNOR TO AKTIENGESELLSCHAFT BROWN BOVERI & CIE., OF BADEN, SWITZERLAND, A JOINT STOCK COMPANY OF SWITZERLAND

MACHINE DRIVE CONTROL

Application filed May 17, 1926, Serial No. 109,520, and in Germany June 22, 1925.

This invention relates to machine drives, and pertains particularly to the driving of machines having heavy rotating masses by electric motors.

The general object of the invention is the provision of a machine drive and a control for the same, whereby machines having heavy rotating parts may be started expeditiously and operated efficiently by electric motors.

Another object is the provision of a machine drive whereby the heavy rotating parts may be stopped quickly, and the braking energy utilized to generate electric current.

Another object is the provision of a drive arrangement whereby the starting and stopping may be accomplished by the conjoint use of a plurality of motors, and the running operation of the machine between periods of acceleration and deceleration accomplished by one of the motors.

Another object is the provision of an arrangement whereby the running operation may be distributed among the various motors in turn.

Other and further objects will be pointed out or indicated hereinafter or obvious to one skilled in the art upon an understanding of the invention.

In the drawing forming a part of this specification I show diagrammatically one arrangement of apparatus utilizing the invention, but this is presented for purpose of illustration only, and is not to be construed to impose upon the claims any limitations not necessitated by the prior art.

When machines are required to be frequently started and stopped it is desirable that the time required for this purpose should be reduced as far as possible. If the machines incorporate heavy rotating masses, such as centrifugal filters, extractors or driers for example, a short starting period can only be obtained by using a correspondingly powerful motor. At the end of the starting period, when only a comparatively small torque is required to maintain steady running, such a motor would only be operating at a small fraction of its full-load capacity and hence with a very low efficiency.

According to the invention this can be avoided by employing two or more motors for driving such machines, the motor outputs being chosen such that any one can supply the torque required under steady running conditions. All the motors are connected up during starting so that the acceleration may be as high as possible, and on the full working speed being attained all but one are cut out. The switch gear should preferably be so arranged that all the motors may be used in turn for maintaining steady running conditions. The advantage offered by such an arrangement is that the motors may be alternately given periods of rest during which they can cool down, thus permitting them to be more heavily loaded during starting. Furthermore, the motors may be chosen on the basis of their intermittent rating.

The invention may be applied with particular advantage to centrifugal filters, extractors or driers, which are driven by motors having series characteristics. Such motors are in great favour for drives of the type mentioned, as they develop a high starting torque and when properly chosen for the work ensure rapid acceleration of the machines. Their disadvantage, however, is that they do not attain a state of equilibrium at the normal running speed but continue to accelerate in accordance with their characteristics. With prior arrangements this must be prevented by inserting resistance in the motor circuit or employing some similar means, as a result of which the efficiency of the plant, already low owing to the insufficient utilization of the motors during the steady running periods, is still further reduced. By using a number of motors in accordance with the present invention, and cutting out all except one when normal running speed is reached it is possible, with a proper choice of sizes, to ensure that the motor for maintaining full speed is fully utilized and maintains the correct speed without resistance regulation, i. e. is working at maximum efficiency.

The driving motors $m^1$ and $m^2$ having their fields $e^1$, $e^2$ energized from the line L are two alternating current commutator motors of the repulsion type which have series characteristics and are controlled by brush shifting. The rotors are arranged to drive the operated machine k. The use of this type of motor for the duty in question brings with it additional advantages, as starting is performed without the use of rheostats with their accompanying losses, and when braking, a part at least of the kinetic energy stored in the machine is converted back into electrical energy and returned to the mains. In the arrangement shown, the disconnection of one of the motors $m^1$, $m^2$ when normal running speed has been reached is performed automatically by the centrifugal switch $z$, which by opening a switch $f$ releases one of the two solenoid-operated switches $s^1$, $s^2$, according to the position of the change-over switch $u$, and cuts out the corresponding motor.

To start up the machines, the lever $h$ is moved to the left, thus, through the rods $g$ and $j$, displacing the brushes of the motors in the required direction, the rod $j$ being connected to the brush shifting gear. At the same time, the two contactors $s^1$ and $s^2$ are energized by the closing of the circuit via the auxiliary switch $i^1$, change over switch $u$ and centrifugal switch $z$. The motors are thereby connected to the mains. On the completion of the starting period, that is, when normal running speed has been attained, the previously set centrifugal device $z$ breaks the circuit of one of the contactors, the one affected ($s^1$ as shown on the drawing) depending on the position of the change-over switch $u$, and cuts out the corresponding motor ($m^1$). The remaining motor ($m^2$) will, if properly dimensioned, maintain the speed of the machine at the correct value. Any small variations which occur can be compensated by suitably displacing the lever $h$.

To stop the machine the lever $h$ is moved to the right to close on contact $i^2$ and close solenoid switch $s^2$. The motor thus placed in circuit ($m^2$) then acts as a generator, due to its brush position, and ensures rapid deceleration. As soon as the speed has fallen somewhat, the contact of the centrifugal switch $z$ is reclosed, as a result of which the second motor ($m^1$) is put in circuit, thereby doubling the braking effect. If desired a second auxiliary switch $i^3$ (shown dotted) connected in parallel with the centrifugal switch and closing only in the braking position, may be provided. When this is done the second motor is put in circuit directly the control lever is turned to the braking position, so that the full braking effect is available at once.

If the change-over switch $u$ is rotated by 90° before the next cycle of operations takes place, the motor $m^2$ will be the one to be cut out when full speed is attained.

The arrangement described is of course capable of modification in many respects.

What I claim is:

1. In apparatus of the character described, a driven element having a given operating speed, a plurality of driving motors therefor, certain of said motors being operable to produce a braking action on said element, means operable during speed conditions of said element below said given speed to effect conjoint driving operation of said motors or to effect braking action of said certain of said motors, and means operable independently of said last-named means and responsive to speed conditions of said element equal substantially to said given speed condition to render certain of said motors ineffective with respect to said element.

2. In apparatus of the character described, a driven element having a given operating speed, electric motors having driving and braking characteristics with respect to said element, means common to said motors for rendering the same conjointly effective to drive or brake said element, and switch means operable independently of said means and responsive to speed conditions of said element equal substantially to said given speed condition to render certain of said motors ineffective with respect to said element.

3. In apparatus of the character described, a driven element having a given operating speed, a motor having driving and braking characteristics with respect to said element, control means for said motor movable to a given position to effect driving action thereof and movable to a different position to effect braking action of the same, a second motor for driving said element, and means cooperable with said control means when the same is in said given position to effect driving action of said second motor conjointly with such action of said first-mentioned motor, said last-named means being responsive to speed conditions of said element equal substantially to said given speed condition and being operable at such speed conditions to render said second motor ineffective with respect to said element.

4. In apparatus of the character described, a driven element having a given operating speed, a plurality of motors each having driving and braking characteristics with respect to said element, means common to said motors for effecting driving or braking action thereof, second means common to said motors and responsive to speed conditions of said element equal substantially to said given speed condition to render the same ineffective with respect to said element, and means operable to render said second means alternately operative with respect to certain of said motors and inoperative with respect to the other of said motors.

5. Machine drive apparatus, comprising the combination with a rotary-driven element, of a plurality of dynamo-electric machines for conjointly or severally driving said element, said machines having brushes shiftable to positions for motor operation and generator operation, electromagnetically-actuated switches for controlling energization of said dynamo-electric machines selectively, a speed-responsive device connected with said driven element for controlling actuation of said switches selectively, mechanically-actuated switch means for controlling actuation of said switches, and means mechanically connecting said brushes and said mechanically-actuated switch means for substantially simultaneous movement thereof.

In testimony whereof I have hereunto subscribed my name at Stuttgart on the 28th day of April A. D. 1926.

FERDINAND JUNGBLUT.